United States Patent
Fukuda et al.

(10) Patent No.: US 9,243,590 B2
(45) Date of Patent: Jan. 26, 2016

(54) METHOD OF DETERMINING CORRECTION AMOUNT OF OPENING DEGREE OF EGR VALVE, METHOD OF CONTROLLING OPENING DEGREE OF EGR VALVE, AND ENGINE

(75) Inventors: Tomohiro Fukuda, Osaka (JP); Atsushi Ueta, Osaka (JP)

(73) Assignee: Yanmar Co., Ltd., Osaka-shi (JP)

( * ) Notice: Subject to any disclaimer, the term of this patent is extended or adjusted under 35 U.S.C. 154(b) by 317 days.

(21) Appl. No.: 14/005,709

(22) PCT Filed: Mar. 16, 2012

(86) PCT No.: PCT/JP2012/056914
§ 371 (c)(1),
(2), (4) Date: Oct. 11, 2013

(87) PCT Pub. No.: WO2012/128224
PCT Pub. Date: Sep. 27, 2012

(65) Prior Publication Data
US 2014/0048051 A1    Feb. 20, 2014

(30) Foreign Application Priority Data
Mar. 18, 2011    (JP) ................................. 2011-060284

(51) Int. Cl.
*F02M 25/07*    (2006.01)
*F02D 41/00*    (2006.01)

(52) U.S. Cl.
CPC ....... *F02M 25/0756* (2013.01); *F02D 41/0052* (2013.01); *F02D 41/0077* (2013.01);
(Continued)

(58) Field of Classification Search
CPC .............. F02D 41/005; F02D 41/0007; F02D 41/0047; F02D 41/0077; F02M 25/07; F02M 25/0702; F02M 25/0707; F02M 25/0756; F02M 25/0772; Y02T 10/18; Y02T 10/144; Y02T 10/47

USPC ............. 123/568.19, 568.21, 568.22, 568.25, 123/568.29; 701/102, 106–108, 110, 114; 60/605.2; 73/114.06, 114.25, 114.33, 73/114.74
See application file for complete search history.

(56) References Cited

U.S. PATENT DOCUMENTS 4,186,698 A    2/1980    Aoyama
5,724,950 A    3/1998    Shino et al.
(Continued)

FOREIGN PATENT DOCUMENTS

DE    197 11 027 A1    11/1997
EP    0 964 141 A2    12/1999
(Continued)

OTHER PUBLICATIONS

Corresponding International Search Report with English Translation dated Jun. 19, 2012 (five (5) pages).

(Continued)

*Primary Examiner* — John Kwon
*Assistant Examiner* — Johnny H Hoang
(74) *Attorney, Agent, or Firm* — Crowell & Moring LLP (57) ABSTRACT

A method determines a correction amount of an EGR valve opening degree. A basic correction amount map is generated indicating a correlation between rotating speed, load factor, and the correction amount, while the opening degree is maintained at a reference opening degree and the EGR rate is maintained at a target EGR rate, based on correction amounts obtained for mutually different individual combinations of the rotating speed and the load factor. Estimated values of the correction amounts not contained in the basic map are acquired by estimating the distribution of the amounts not in the basic map based on a distribution trend. An extended correction amount map is generated indicating a correlation between the estimated values of the rotating speed, the load factor, and the correction amount while the opening degree is maintained at a reference opening degree and the EGR rate is maintained at a target rate.

6 Claims, 5 Drawing Sheets

(52) U.S. Cl.
CPC ....... *F02M25/0745* (2013.01); *F02M 25/0746* (2013.01); *F02D 41/0072* (2013.01); *F02M 25/0707* (2013.01); *Y02T 10/47* (2013.01)

(56) References Cited

U.S. PATENT DOCUMENTS

| | | | | |
|---|---|---|---|---|
| 6,182,645 | B1* | 2/2001 | Tsuchiya | F02D 41/0077 123/568.23 |
| 6,415,776 | B1* | 7/2002 | Gates | F02D 41/0072 123/568.24 |
| 6,435,166 | B1* | 8/2002 | Sato | F02D 21/08 123/568.12 |
| 6,480,782 | B2* | 11/2002 | Brackney | F02D 41/0052 123/568.21 |
| 7,739,027 | B2* | 6/2010 | Kang | F02D 13/0219 123/568.16 |
| 2003/0192517 | A1* | 10/2003 | Gates | F02D 11/10 123/568.16 |
| 2003/0196646 | A1* | 10/2003 | Shoyama | F02D 13/0246 123/568.14 |
| 2010/0179745 | A1* | 7/2010 | Nakayama | F02D 41/0072 701/108 |
| 2011/0308503 | A1* | 12/2011 | Yasui | F02D 41/005 123/568.21 |
| 2012/0095664 | A1* | 4/2012 | Nakamura | F02D 41/0052 701/102 |
| 2013/0080034 | A1* | 3/2013 | Chi | F02D 41/0065 701/108 |
| 2013/0138324 | A1* | 5/2013 | Ibuki | F02D 45/00 701/102 |
| 2014/0007855 | A1* | 1/2014 | Kosaka | F02D 41/02 123/568.21 |

FOREIGN PATENT DOCUMENTS

| | | |
|---|---|---|
| JP | 62-298654 A | 12/1987 |
| JP | 4-252849 A | 9/1992 |
| JP | 11-62720 A | 3/1999 |
| JP | 2000-356158 A | 12/2000 |
| JP | 2005-233000 A | 9/2005 |
| JP | 2010-144700 A | 7/2010 |
| JP | 2012-31740 A | 2/2012 |
| WO | WO 2010/035554 A1 | 4/2010 |

OTHER PUBLICATIONS

Japanese-language Written Opinion dated Jun. 19, 2012 (PCT/ISA/237) (three (3) pages).
European Search Report dated Aug. 1, 2014 (Four (4) pages).
International Preliminary Report on Patentability (PCT/IB/326 & PCT/IB/373) dated Oct. 3, 2013, including English translation of Document C2 (Japanese-language Written Opinion (PCT/ISA/237)) previously submitted on Sep. 17, 2013.

* cited by examiner

METHOD OF DETERMINING CORRECTION AMOUNT OF OPENING DEGREE OF EGR VALVE, METHOD OF CONTROLLING OPENING DEGREE OF EGR VALVE, AND ENGINE

TECHNICAL FIELD

The present invention relates to a method of determining a correction amount of an opening degree of an EGR valve, the method determining the correction amount for correcting the opening degree to a target opening degree corresponding to a differential pressure between an exhaust pressure and an intake pressure such that an EGR rate is maintained at a predetermined target EGR rate, the opening degree, and the air intake amount, even when the differential pressure changes.

BACKGROUND ART

In an EGR apparatus, an intake pipe and an exhaust pipe are linked through an EGR pipe so that exhaust gas is supplied through the EGR pipe to the intake pipe. Further, in the inside of the EGR pipe, an EGR valve is provided for controlling the flow rate of the EGR gas (the exhaust gas flowing through the intake pipe).

In a technique investigated presently, a differential pressure between the exhaust pressure and the intake pressure is detected and then the opening degree of the EGR valve is corrected in accordance with the differential pressure so that changing of the EGR rate caused by changing of the differential pressure is suppressed. An example of such a technique is, for example, a technique described in Patent Document 1 by the present applicant.

Here, the EGR rate, the EGR gas amount, the air intake amount, the differential pressure, and the opening degree satisfy the following relations shown in Formulas (1) and (2).

EGR rate=EGR gas amount/(air intake amount+EGR gas amount)   (1)

EGR Gas Amount=Proportionality Constant*Differential Pressure*Opening Degree Of an EGR Valve   (2)

The EGR rate is specified by detecting the air intake amount, the differential pressure, and the opening degree of the EGR valve. Therefore, when the opening degree is changed in accordance with changing of the differential pressure, the EGR rate can be maintained at a predetermined target rate.

CITATION LIST

Patent Literature

Patent Document 1 Japanese Patent Application No. 2010-169472

SUMMARY OF INVENTION

Technical Problem

As described above, the EGR gas amount is obtained as a value proportional to the product of the differential pressure and the opening degree of the EGR valve. Therefore, when the average exhaust pressure is higher than the average intake pressure and hence the differential pressure has a negative value, the EGR gas amount cannot be obtained.

Since the exhaust gas has a higher temperature than the intake air, in general, the exhaust pressure is higher than the intake pressure. Therefore, the intake air does not flow backward from the intake pipe to the exhaust pipe. On the other hand, in an engine with a turbocharger, the intake pressure is increased. This causes condition that the intake pressure is higher than the exhaust pressure. Here, in accurate description, the intake pressure and the exhaust pressure respectively indicate the average intake pressure and the average exhaust pressure which are averaged values of the intake pressure and the exhaust pressure per unit time. The intake pressure and the exhaust pressure have ripples in association with the opening and closing of the intake valve and the exhaust valve. Therefore, even when the average intake pressure is higher than the average exhaust pressure, the exhaust pressure becomes higher than the intake pressure momentarily, in some cases. Accordingly, even in a case that the intake pressure is higher than the exhaust pressure, EGR (exhaust gas recirculation) can be implemented. Here, for the purpose of preventing the intake air from flowing into the exhaust pipe, a reed valve that opens only when the exhaust pressure is higher than the intake pressure is provided in the inside of the EGR pipe.

That is, in the above-mentioned determination Formula (2) for the EGR gas amount, it is premised that a constant differential pressure always acts in the EGR pipe and is not premised that the EGR gas flows through the reed valve into the intake pipe owing to the ripples in the intake pressure and the exhaust pressure. Therefore, when the average exhaust pressure is higher than the average intake pressure, a correction amount used for correcting the opening degree of the EGR valve cannot be specified. Since the correction amount cannot be specified, correcting the opening degree of the EGR valve such that changing of the EGR rate caused by changing of the differential pressure should be suppressed cannot be performed.

Therefore, the present invention provides a method of determining a correction amount of the opening degree of the EGR valve, in which even in operating condition where a correction value is not obtained like in operating condition where the average exhaust pressure is higher than the average intake pressure, a correction amount of the opening degree of an EGR valve can be determined such that the EGR rate is maintained at constant.

Solution to Problem

The present invention provides a method of determining a correction amount of an opening degree of an EGR valve, the method determining the correction amount for correcting the opening degree to a target opening degree corresponding to a differential pressure between an exhaust pressure and an intake pressure such that an EGR rate is maintained at a predetermined target EGR rate, the EGR rate being specified on the basis of the differential pressure, the opening degree, and the air intake amount, even when the differential pressure changes, the method comprises: a differential pressure map generating step of generating a differential pressure map indicating a correlation between a rotating speed of an engine, a load factor of the engine, and the differential pressure while the opening degree is maintained at a reference opening degree, the differential pressure map being set for each of a plurality of mutually different reference opening degrees; a correction amount calculating step of calculating the correction amount equal to a difference between the target opening degree and the reference opening degree for each of mutually different combinations of the rotating speed and the load factor, by utilizing that the target opening degree is specified on the basis of the target EGR rate, the differential pressure, and the air intake amount, and that the differential pressure is specified on the basis of the rotating speed and the load factor; a basic correction amount map generating step of generating a basic correction amount map indicating a correlation between the rotating speed, the load factor, and the correction amount while the opening degree is maintained at the reference opening degree and the EGR rate is maintained at the target EGR rate, on the basis of the correction amount obtained for each of mutually different combinations of the rotating speed and the load factor; and an extended correction amount map generating step of acquiring estimated values of correction amounts not contained in the basic correction amount map, by estimating the distribution of the correction amounts not contained in the basic correction amount map, on the basis of a trend in the distribution of the correction amounts contained in the basic correction amount map, and generating an extended correction amount map indicating a correlation between the rotating speed, the load factor, and the estimated value of the correction amount, while the opening degree is maintained at the reference opening degree and the EGR rate is maintained at the target EGR rate.

Preferably, the correction amount contained in the basic correction amount map is the correction amount corresponding to each combination of the rotating speed and the load factor, while the differential pressure is zero or positive, and the correction amount contained in the extended correction amount map is the correction amount corresponding to each combination of the rotating speed and the load factor, while the differential pressure is negative.

The present invention provides a method of controlling the opening degree of the EGR valve, comprising: a rotating speed detection step of detecting the rotating speed; a load factor detection step of detecting the load factor; an air intake amount detection step of detecting the air intake amount; a correction amount specifying step of specifying the correction amount corresponding to the reference opening degree, the rotating speed, and the load factor, on the basis of a plurality of the basic correction amount maps and the extended correction amount maps obtained by the method of determining the correction amount of the opening degree of the EGR valve; and an opening degree controlling step of controlling the opening degree to the target opening degree corresponding to the correction amount and the reference opening degree having been specified.

The present invention provides an engine comprising: a rotating speed detection section for detecting the rotating speed; a load factor detection section for detecting the load factor; an air intake amount detection section for detecting the air intake amount; a correction amount map specifying section for specifying the correction amount corresponding to the reference opening degree, the rotating speed, and the load factor, on the basis of a plurality of the basic correction amount maps and the extended correction amount maps obtained by the method of determining the correction amount of the opening degree of the EGR valve; and a correction amount specifying section specifying the correction amount corresponding to the reference opening degree, the rotating speed, and the load factor, on the basis of the correction amount map having been specified; and an opening degree control section for controlling the opening degree to the target opening degree corresponding to the correction amount and the reference opening degree having been specified.

Advantageous Effects of Invention

The method of determining the correction amount of opening degree of the EGR valve according to the present invention can specify the correction amount on the basis of estimated values of the correction values. Therefore, the method can determine the correction amount of the opening degree of the EGR valve such that the EGR rate is maintained at constant, even in operating condition where the correction values are not obtained like in operating condition where the average exhaust pressure is higher than the average intake pressure.

The method of controlling the opening degree of the EGR valve and the engine according to the present invention can correct the opening degree of the EGR valve such that the EGR rate is maintained at constant, even in operating condition where the correction values are not obtained like in operating condition where the average exhaust pressure is higher than the average intake pressure.

DESCRIPTION OF EMBODIMENTS

Figure 1:
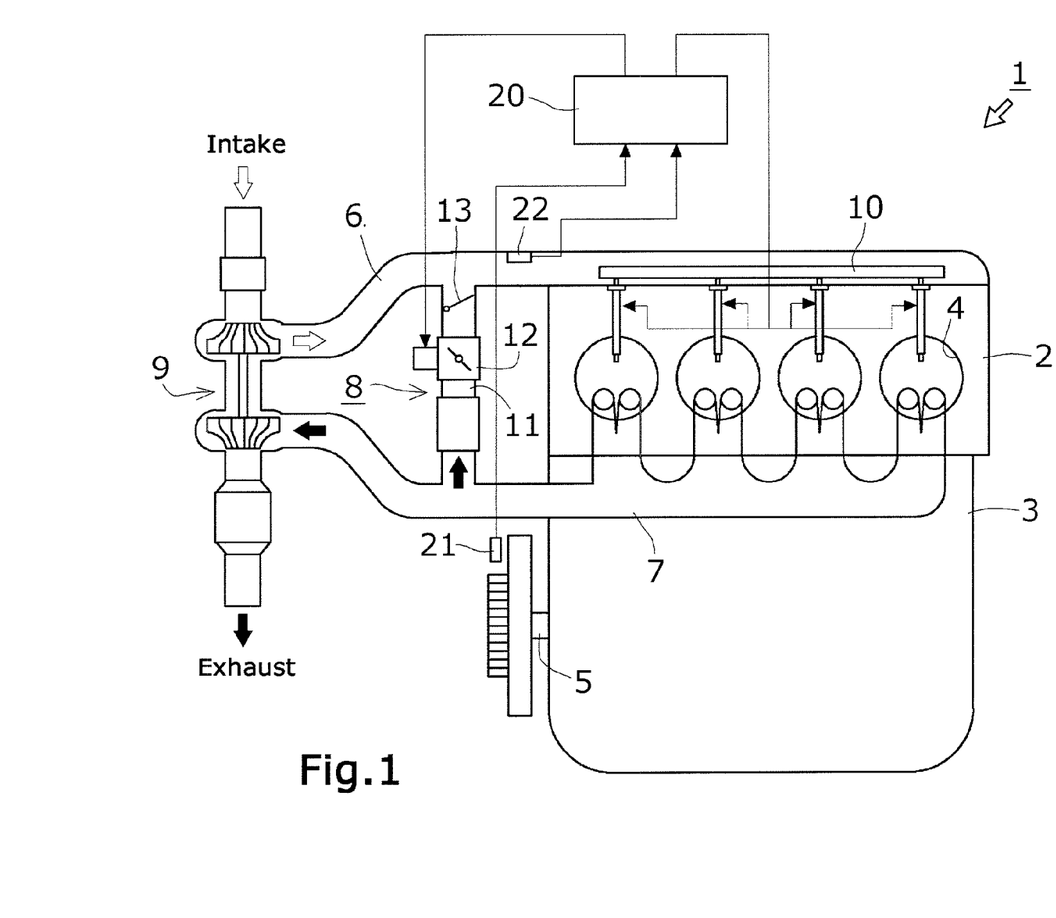
FIG. 1 is a configuration diagram of an engine 1.

FIG. 1 is a configuration diagram of an engine 1. The engine 1 includes a cylinder head 2, a cylinder block 3, a plurality of cylinders 4, a crankshaft 5, an intake pipe 6, an exhaust pipe 7, an exhaust gas recirculation apparatus (an EGR apparatus, hereinafter) 8, a turbocharger 9, and a common rail type fuel injection apparatus (a common rail, hereinafter) 10.

The EGR apparatus 8 includes an EGR pipe 11, an EGR valve 12, and a reed valve 13. The EGR pipe 11 establishes fluid communication between the exhaust pipe 7 and the intake pipe 6. The EGR valve 12 and the reed valve 13 are arranged in the inside of the EGR pipe 11. The EGR valve 12 changes the flow rate of the exhaust gas passing through the inside of the EGR pipe 11, by changing an opening degree thereof. In the inside of the EGR pipe 11, the reed valve 13 permits only the flow of the exhaust gas from the exhaust pipe 7 to the intake pipe 6 and inhibits the flow of the exhaust gas from the intake pipe 6 to the exhaust pipe 7. In the flowing description, the exhaust gas flowing from the exhaust pipe 7 through the EGR pipe 11 to the intake pipe 6 is referred to as EGR gas.

Further, as a configuration for control, the engine 1 includes a control unit 20, a rotating speed sensor 21, and an air flow meter 22. The rotating speed sensor 21 detects the rotating speed of the crankshaft 5. The air flow meter 22 detects the mixed intake amount passing through the intake pipe 6. Here, the air flow meter 22 is arranged in the downstream of the outlet of the EGR pipe 11 in the intake pipe 6. Therefore, the mixed intake amount indicates the amount of gas where the EGR gas has been mixed into the outside air.

That is, the mixed intake amount indicates the total amount of the air intake amount and the EGR gas amount. The control unit 20 is capable of acquiring detection information of the rotating speed sensor 21 and the air flow meter 22. Further, the control unit 20 controls the common rail 10 and the EGR valve 12.

The control unit 20 is configured to control the opening degree of the EGR valve 12 to a target opening degree corresponding to the differential pressure such that the EGR rate is maintained at a predetermined target rate, even when the differential pressure between the exhaust pressure and the intake pressure changes. The control unit 20 stores a correction amount map CM used for correcting the opening degree of the EGR valve 12 to the target opening degree. The correction amount map CM is generated by a later-described method of determining a correction amount of the opening degree of the EGR valve.

The method of determining a correction amount of the opening degree of the EGR valve is described below with reference to FIGS. 2 to 4. This correction amount determination method includes a differential pressure map generating step, a correction amount calculating step, a basic correction amount map generating step, and an extended correction amount map generating step.

The correction amount determination method determines a correction amount used for obtaining a target opening degree for realizing a target EGR rate such that the EGR rate is maintained at the predetermined target EGR rate. Here, the correction amount indicates the difference between the target opening degree and a predetermined reference opening degree. Further, the EGR rate to be specified on the basis of the differential pressure, the opening degree of the EGR valve, and the air intake amount varies depending on the magnitude of the reference opening degree. Since the exhaust pressure varies depending on the EGR rate, the differential pressure also varies and hence the correction amount to be set up depending on the differential pressure also varies. That is, the magnitude of the correction amount varies depending not only on the magnitude of the target EGR rate but also on the magnitude of the reference opening degree. The correction amount is set up for each reference opening degree. Therefore, when the number of mutually different reference opening degrees is increased, precision in the correction is improved. Nevertheless, since a large amount of data of correction amount is set up for each reference opening degree, the amount of data to be stored in the control unit 20 increases. Therefore, the number of reference opening degrees is limited to a certain value.

In the present embodiment, a first to a sixth reference opening degree (%) are set up as predetermined reference opening degrees. The values are 0%, 20%, 40%, 60%, 80%, and 100%. An n-th reference opening degree indicates any one of the first to the sixth reference opening degree. A differential pressure map and a correction amount map CM described later are set up for each reference opening degree.

Differential Pressure Map Generating Step

Figure 2:
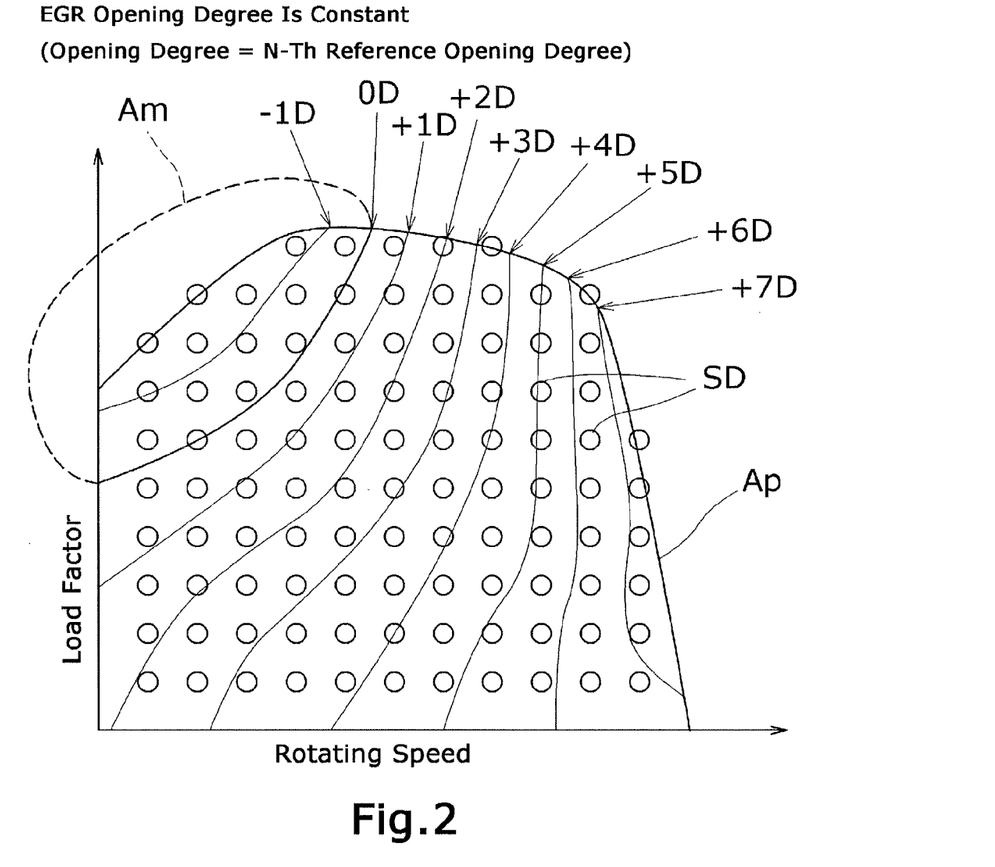
FIG. 2 is a diagram showing a differential pressure map indicating a correlation between a rotating speed, a load factor, and a differential pressure while an opening degree is maintained at an n-th reference opening degree.

FIG. 2 is a diagram showing a differential pressure map indicating a correlation between a rotating speed, a load factor, and a differential pressure while an opening degree is maintained at an n-th reference opening degree. In FIG. 2, the horizontal axis indicates the rotating speed of the engine 1. The vertical axis indicates the load factor of the engine 1. The load factor indicates a ratio concerning the fuel injection amount per one revolution of the engine 1 and is defined as the ratio of the present fuel injection amount to the maximum fuel injection amount that can be set up. Here, the engine 1 is controlled such that the rotating speed is maintained at constant. Therefore, the fuel injection amount increases with increasing load on the engine 1. The differential pressure indicates a pressure difference obtained by subtracting the intake pressure from the exhaust pressure.

Here, in the present specification, the intake pressure and the exhaust pressure respectively indicate the average intake pressure and the average exhaust pressure which are averaged values of the intake pressure and the exhaust pressure per unit time.

The differential pressure map generating step is a step of generating the differential pressure map shown in FIG. 2. In FIG. 2, for each of mutually different combinations of the rotating speed and the load factor, a differential pressure corresponding to the rotating speed and the load factor is obtained. In FIG. 2, each differential pressure data set SD indicates a set of data consisting of the rotating speed, the load factor, and the differential pressure, which is specified by one of mutually different combinations of the rotating speed and the load factor. Here, in accordance with the characteristics of the engine 1, the differential pressure corresponding to the rotating speed and the load factor can be detected experimentally.

In FIG. 2, a plurality of equi-pressure lines are drawn. Each equi-pressure line is a set of coordinates (a rotating speed and a load factor) where the differential pressure is the same on the differential pressure map. The magnitude of differential pressure on each equi-pressure line is, for example, any one of −1D, 0, and +1D to +7D. The symbol (D) indicates the absolute value of a differential pressure of certain value. The sign (+) or (−) indicates whether the differential pressure is positive or negative. The numeric character (2) or the like added to the symbol (D) indicates a ratio to the differential pressure of certain value. The magnitude of a differential pressure of +4D is twice the differential pressure of +2D.

A plurality of equi-pressure lines indicate a trend in the distribution of differential pressure. The differential pressure is increasing from the upper left region toward the right-hand side region in FIG. 2. The upper left region in FIG. 2 is a negative pressure region Am where the differential pressure is negative. The other region is a positive pressure region Ap where the differential pressure is positive.

Correction Amount Calculating Step

The correction amount calculating step is a step of calculating a correction amount that is equal to the difference between the target opening degree and the reference opening degree, for each of mutually different combinations of the rotating speed and the load factor. As shown in Formula (3), the correction amount is the difference between the target opening degree and the reference opening degree. That is, as shown in Formula (4), the target opening degree serving as the opening degree after correction is the sum of the reference opening degree and the correction amount.

$$\text{Correction Amount} = \text{Target Opening Degree} - \text{Reference Opening Degree} \quad (3)$$

$$\text{Target Opening Degree (Opening Degree After Correction)} = \text{Reference Opening Degree} + \text{Correction Amount} \quad (4)$$

Here, the EGR rate, the EGR gas amount, the air intake amount, the differential pressure, and the opening degree satisfy the following relations shown in Formulas (1) and (2).

$$\text{EGR Rate} = \text{EGR Gas Amount}/(\text{Air Intake Amount} + \text{EGR Gas Amount}) \quad (1)$$

$$\text{EGR Gas Amount} = \text{Proportionality Constant} * \text{Differential Pressure} * \text{Opening Degree of EGR Valve} \quad (2)$$

Since the opening degree is specified on the basis of the EGR rate, the differential pressure, and the air intake amount, the target opening degree is specified on the basis of the target EGR rate, the differential pressure, and the air intake amount. Therefore, the correction amount equal to the difference between the target opening degree and the reference opening degree is specified on the basis of the reference opening degree, the target EGR rate, the differential pressure, and the air intake amount. Further, as shown in the correction map in FIG. 2, the differential pressure is specified on the basis of the rotating speed and the load factor. Therefore, the correction amount is specified on the basis of the reference opening degree, the target EGR rate, the rotating speed, the load factor, and the air intake amount. The reference opening degree, the target EGR rate, and the air intake amount are constants specified depending on the operating condition and the like. The rotating speed, the load factor, and the correction amount are variables. Therefore, in the correction amount calculating step, a correction amount is obtained for each of mutually different combinations of the rotating speed and the load factor.

Nevertheless, when the differential pressure is negative, the correction amount cannot be specified on the basis of the reference opening degree, the target EGR rate, the rotating speed, the load factor, and the air intake amount. Therefore, the correction amount cannot be obtained from the combinations of the rotating speed and the load factor contained in the negative pressure region Am.

Basic Correction Amount Map Generating Step

Figure 3:
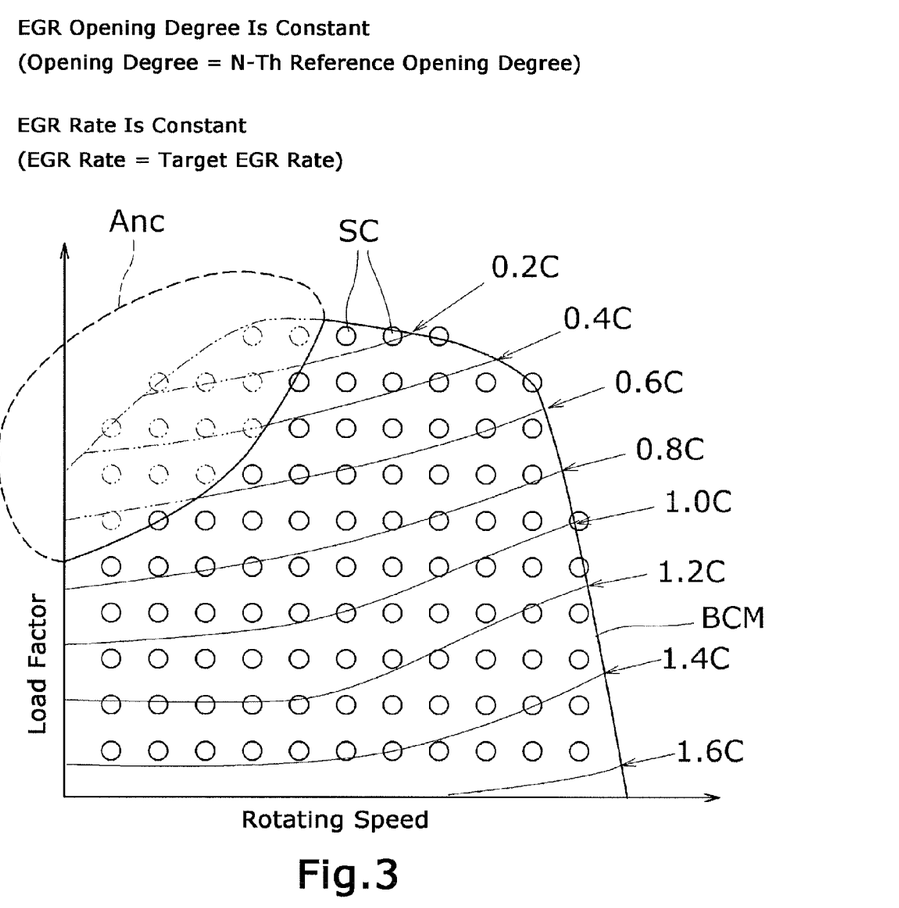
FIG. 3 is a diagram showing a basic correction amount map indicating a correlation between a rotating speed, a load factor, and a correction amount while an opening degree is maintained at an n-th reference opening degree and an EGR rate is maintained at a target EGR rate.

The basic correction amount map generating step is a step of generating a basic correction amount map BCM shown in FIG. 3, for example. The basic correction amount map BCM indicates a correlation between the rotating speed, the load factor, and the correction amount while the EGR rate is maintained at the target EGR rate. The basic correction amount map BCM is generated on the basis of the correction amount obtained for each of mutually different combinations of the rotating speed and the load factor. Further, one of mutually different basic correction amount maps BCM is generated for each of mutually different reference opening degrees.

FIG. 3 is a diagram showing a basic correction amount map indicating a correlation between a rotating speed, a load factor, and a correction amount while an opening degree is maintained at an n-th reference opening degree and an EGR rate is maintained at a target EGR rate. In FIG. 3, the horizontal axis indicates the rotating speed. The vertical axis indicates the load factor. In FIG. 3, for each of mutually different combinations of the rotating speed and the load factor, a correction amount is shown that corresponds to the rotating speed and the load factor. In FIG. 3, each correction amount data set SC indicates a set of data consisting of the rotating speed, the load factor, and the correction amount, which is specified by one of mutually different combinations of the rotating speed and the load factor.

In FIG. 3, isopleth lines for a plurality of correction amounts are drawn. Each isopleth line is a set of coordinates (a rotating speed and a load factor) where the correction amount is the same on the basic correction amount map BCM. The magnitude of correction amount on each isopleth line is, for example, any one of 0.2C, 0.4C, and 0.6C to 1.6C. Here, the magnitude of correction amount on the isopleth line is set up as an equal interval of 0.2C. The symbol (C) indicates a correction amount of certain value. The numeric character (2) or the like added to the symbol (C) indicates a ratio to the correction amount of certain value. The magnitude of a correction amount of 0.4C is 0.4 times the correction amount of 1.0C. That is, an arbitrary correction amount is adopted as a reference and then other correction amount is expressed by using a ratio to the reference correction amount.

A plurality of isopleth lines indicate a trend in the distribution of correction amounts. The correction amount is increasing from the upper region toward the lower region in FIG. 3.

The differential pressure map in FIG. 2 and the basic correction amount map BCM in FIG. 3 include the rotating speed and the load factor as elements. Therefore, basically, the differential pressure map and the basic correction amount map BCM correspond to each other. Nevertheless, as described above, the correction amount is not obtained in the negative pressure region Am. Therefore, the basic correction amount map BCM in FIG. 3 does not contain an uncorrectable region Anc corresponding to the negative pressure region Am. The basic correction amount map BCM in FIG. 3 lacks the upper left region in comparison with the differential pressure map in FIG. 2.

Extended Correction Amount Map Generating Step

The extended correction amount map generating step is a step of generating an extended correction amount map ECM that indicates a correlation between the rotating speed, the load factor, and the estimated value of the correction amount, while the opening degree is maintained at the n-th reference opening degree and the EGR rate is maintained at the target EGR rate. Here, the above-mentioned basic correction amount map BCM indicates a correlation between the rotating speed, the load factor, and the correction amount in a region corresponding to the positive pressure region Ap in the differential pressure map in FIG. 2. Therefore, the basic correction amount map BCM does not indicate a correlation between the rotating speed, the load factor, and the correction amount in the region corresponding to the negative pressure region Am. Accordingly, an extended correction amount map ECM is generated as a map indicating a correlation between the rotating speed, the load factor, and the correction amount in the region corresponding to the negative pressure region Am. Here, since the correction amount is not obtained in the negative pressure region Am, in the extended correction amount map ECM, an estimated value of the correction amount is used instead of the correction amount. The estimated value of the correction amount is acquired by, on the basis of a trend in the distribution of the correction amounts contained in the basic correction amount map BCM, estimating the distribution of correction amounts not contained in the basic correction amount map BCM.

Figure 4:
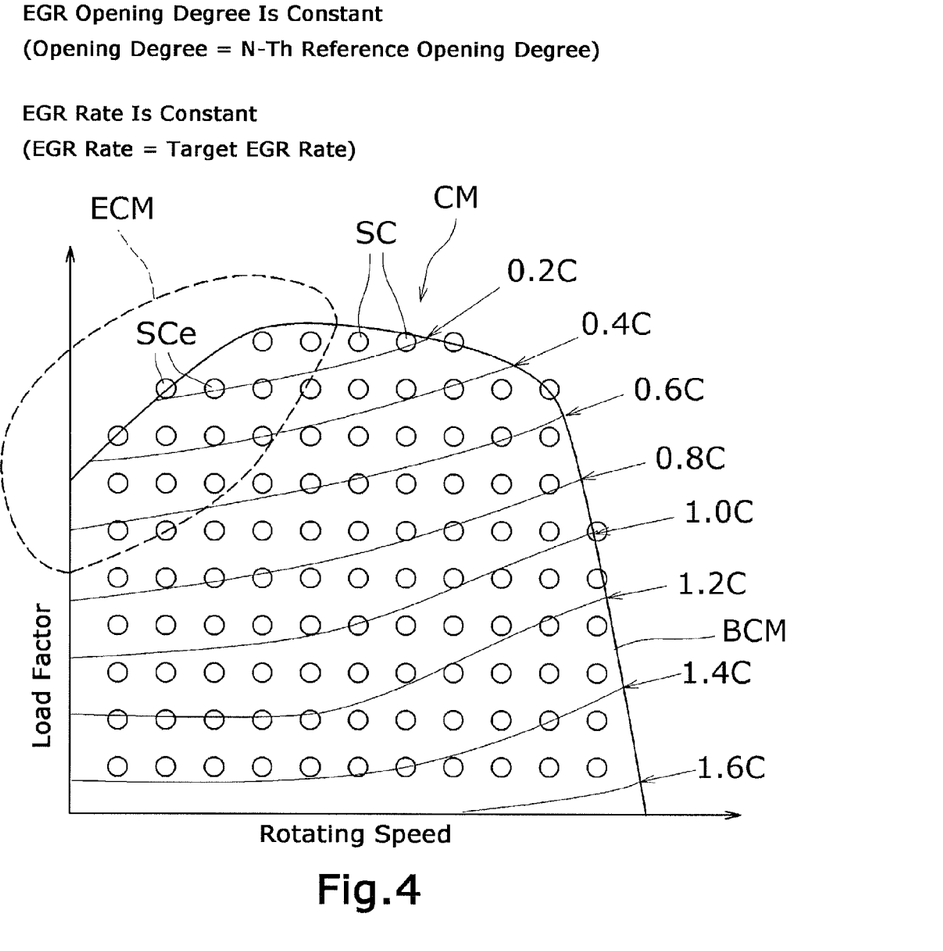
FIG. 4 is a diagram showing a basic correction amount map indicating a correlation between a rotating speed, a load factor, and a correction amount while an opening degree is maintained at an n-th reference opening degree and an EGR rate is maintained at a target EGR rate.

FIG. 4 is a diagram showing a basic correction amount map indicating a correlation between a rotating speed, a load factor, and a correction amount while an opening degree is maintained at an n-th reference opening degree and an EGR rate is maintained at a target EGR rate. The extended correction amount map generating step generates an extended correction amount map ECM that fills the uncorrectable region Anc, on the basis of the basic correction amount map BCM in FIG. 3. In FIG. 4, for each of mutually different combinations of the rotating speed and the load factor, an estimated value of the correction amount is shown that corresponds to the rotating speed and the load factor. In FIG. 4, each estimated correction amount data set SCe indicates a set of data consisting of the rotating speed, the load factor, and the estimated value of the correction amount, which is specified by one of mutually different combinations of the rotating speed and the load factor.

For example, the estimated value of the correction amount is acquired as follows. In FIG. 3, the isopleth line is set up for each correction amount of certain value and the difference of correction amounts between adjacent isopleth lines is (0.2C). Therefore, distribution of the isopleth lines in the uncorrectable region Anc can be estimated on the basis of the trend in the distribution of the isopleth lines shown by solid lines. In FIG. 3, estimated isopleth lines are shown by the two-dot chain lines. As a result, the estimated value of the correction amount in the uncorrectable region Anc is acquired and then the extended correction amount map ECM is generated. Alternatively, by a curve fitting method based on the correction amount data set SC, a function may be generated in which the rotating speed and the load factor serve as independent variables and the correction amount serves as a dependent variable. Then, on the basis of this function, the estimated value of the correction amount in the uncorrectable region Anc may be acquired.

The correction amount map CM shown in FIG. 4 is generated by combining the basic correction amount map BCM and the extended correction amount map ECM. Since the basic correction amount map BCM and the extended correction amount map ECM are set up for each reference opening degree, the correction amount map CM also is set up for each reference opening degree. Therefore, the control unit 20 stores a plurality of correction amount maps CM for mutually different reference opening degrees.

The correction amount determination method according to the present embodiment can specify the correction amount on the basis of the estimated value of the correction value. Therefore, even in operating condition that a correction value is not obtained, a correction amount of the opening degree of the EGR valve 12 can be determined such that the EGR rate is maintained at constant. Here, the operating condition indicates a state specified by the rotating speed and the load factor, and indicates, for example, the magnitude of differential pressure.

A method of controlling the opening degree of the EGR valve is described below with reference to FIG. 5. The method of controlling the opening degree of the EGR valve specifies the correction amount of the opening degree corresponding to the operating condition, on the basis of a plurality of correction amount maps SM obtained by the method of determining the correction amount of the opening degree of the EGR valve, and controls the opening degree such that the EGR rate is maintained at constant.

The method of controlling the opening degree of the EGR valve includes a rotating speed detection step, a load factor detection step, an air intake amount detection step, a correction amount map specifying step, and an opening degree controlling step.

Figure 5:
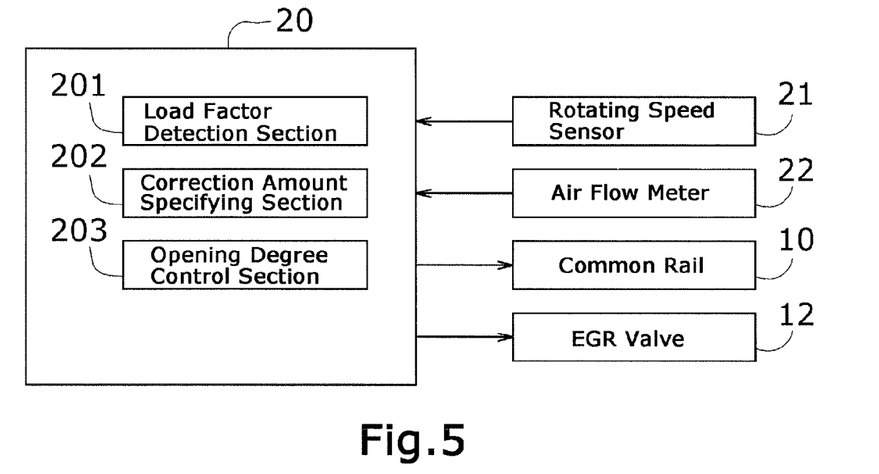
FIG. 5 is a block diagram showing a configuration related to control of an opening degree.

FIG. 5 is a block diagram showing a configuration related to control of an opening degree. In FIG. 5, the control unit 20 includes a load factor detection section 201, a correction amount specifying section 202, and an opening degree control section 203.

In the rotating speed detection step, the rotating speed sensor (the rotating speed detection section) 21 detects the rotating speed of the engine 1.

In the load factor detection step, the load factor detection section 201 detects the load factor on the basis of the fuel injection amount instructed to the common rail 10. As described above, the control unit 20 changes the command value of the fuel injection amount in accordance with changing of the load so as to control the engine 1 such that the rotating speed is maintained at constant. Therefore, the control unit 20 can recognize changing of the load on the basis of changing of the command value of the fuel injection amount.

In the air intake amount detection step, the air flow meter (the air intake amount detection section) 22 detects the mixed intake amount passing through the intake pipe 6. Here, as described above, the mixed intake amount is the total amount of the air intake amount and the EGR gas. Therefore, the air intake amount can be specified on the basis of the mixed intake quantity and the EGR gas.

In the correction amount specifying step, the correction amount specifying section 202 specifies the correction amount corresponding to the reference opening degree, the rotating speed, and the load factor on the basis of the plurality of correction amount maps CM. The correction amount specifying step is composed of two steps of processing. In the first phase, among the plurality of correction amount maps CM, the correction amount specifying section 202 specifies a correction amount map for a reference opening degree closest to the present value of the opening degree. Here, the control unit 20 generates the command value of the opening degree and then, on the basis of the command value, the opening degree of the EGR valve 12 is controlled. That is, the present value of the opening degree is the opening degree before correction and indicates the command value of the opening degree at present. For example, when the present value of the opening degree is 35%, a reference opening degree closest to the present value of the opening degree is 40% which is the third reference opening degree among the first to the sixth reference opening degree. In this case, the correction amount map CM corresponding to the third reference opening degree is specified. In the second phase, the correction amount specifying section 202 specifies a correction amount corresponding to the rotating speed and the load factor on the basis of the specified correction amount map CM. Here, the rotating speed and the load factor used for specifying the correction amount are the rotating speed and the load factor detected in the rotating speed detection step and the load factor detection step.

In the opening degree controlling step, the opening degree control section 203 controls the opening degree to the target opening degree corresponding to the correction amount and the reference opening degree having been specified. As shown in the above-mentioned Formula (4), the target opening degree is the sum of the reference opening degree and the correction amount. As such, the opening degree of the EGR valve is corrected such that the EGR rate is maintained at constant.

In the method of controlling the opening degree of the EGR valve according to the present embodiment, even in operating condition where the correction value is not obtained, the opening degree of the EGR valve can be corrected such that the EGR rate is maintained at constant.

REFERENCE SIGNS LIST

1 Engine
12 EGR valve
20 Control unit
21 Rotating speed sensor (rotating speed detection section)
22 Air flow meter (air intake amount detection section)
201 Load factor detection section
202 Correction amount specifying section 203 Opening degree control section
BCM Basic correction amount map
ECM Extension correction amount map
Anc Uncorrectable region

The invention claimed is:

1. A method of determining a correction amount of an opening degree of an EGR valve, the method determining the correction amount for correcting the opening degree to a target opening degree corresponding to a differential pressure between an exhaust pressure and an intake pressure such that an EGR rate is maintained at a predetermined target EGR rate, the EGR rate being specified on the basis of the differential pressure, the opening degree, and the air intake amount, even when the differential pressure changes, the method comprises:
   a differential pressure map generating step of generating a differential pressure map indicating a correlation between a rotating speed of an engine, a load factor of the engine, and the differential pressure while the opening degree is maintained at a reference opening degree, the differential pressure map being set for each of a plurality of mutually different reference opening degrees;
   a correction amount calculating step of calculating the correction amount equal to a difference between the target opening degree and the reference opening degree for each of mutually different combinations of the rotating speed and the load factor, by utilizing that the target opening degree is specified on the basis of the target EGR rate, the differential pressure, and the air intake amount, and that the differential pressure is specified on the basis of the rotating speed and the load factor;
   a basic correction amount map generating step of generating a basic correction amount map indicating a correlation between the rotating speed, the load factor, and the correction amount while the opening degree is maintained at the reference opening degree and the EGR rate is maintained at the target EGR rate, on the basis of the correction amount obtained for each of mutually different combinations of the rotating speed and the load factor; and
   an extended correction amount map generating step of acquiring estimated values of correction amounts not contained in the basic correction amount map, by estimating the distribution of the correction amounts not contained in the basic correction amount map, on the basis of a trend in the distribution of the correction amounts contained in the basic correction amount map, and generating an extended correction amount map indicating a correlation between the rotating speed, the load factor, and the estimated value of the correction amount, while the opening degree is maintained at the reference opening degree and the EGR rate is maintained at the target EGR rate.

2. The method of determining the correction amount of the opening degree of the EGR valve according to claim 1, wherein
   the correction amount contained in the basic correction amount map is the correction amount corresponding to each combination of the rotating speed and the load factor, while the differential pressure is zero or positive, and wherein
   the correction amount contained in the extended correction amount map is the correction amount corresponding to each combination of the rotating speed and the load factor, while the differential pressure is negative.

3. A method of controlling the opening degree of the EGR valve, comprising:
   a rotating speed detection step of detecting the rotating speed;
   a load factor detection step of detecting the load factor;
   an air intake amount detection step of detecting the air intake amount;
   a correction amount specifying step of specifying the correction amount corresponding to the reference opening degree, the rotating speed, and the load factor, on the basis of a plurality of the basic correction amount maps and the extended correction amount maps obtained by the method of determining the correction amount of the opening degree of the EGR valve according to claim 1; and
   an opening degree controlling step of controlling the opening degree to the target opening degree corresponding to the correction amount and the reference opening degree having been specified.

4. An engine comprising:
   a rotating speed detection section for detecting the rotating speed;
   a load factor detection section for detecting the load factor;
   an air intake amount detection section for detecting the air intake amount;
   a correction amount map specifying section for specifying the correction amount corresponding to the reference opening degree, the rotating speed, and the load factor, on the basis of a plurality of the basic correction amount maps and the extended correction amount maps obtained by the method of determining the correction amount of the opening degree of the EGR valve according to claim 1; and
   a correction amount specifying section specifying the correction amount corresponding to the reference opening degree, the rotating speed, and the load factor, on the basis of the correction amount map having been specified; and
   an opening degree control section for controlling the opening degree to the target opening degree corresponding to the correction amount and the reference opening degree having been specified.

5. A method of controlling the opening degree of the EGR valve, comprising:
   a rotating speed detection step of detecting the rotating speed;
   a load factor detection step of detecting the load factor;
   an air intake amount detection step of detecting the air intake amount;
   a correction amount specifying step of specifying the correction amount corresponding to the reference opening degree, the rotating speed, and the load factor, on the basis of a plurality of the basic correction amount maps and the extended correction amount maps obtained by the method of determining the correction amount of the opening degree of the EGR valve according to claim 2; and
   an opening degree controlling step of controlling the opening degree to the target opening degree corresponding to the correction amount and the reference opening degree having been specified.

6. An engine comprising:
   a rotating speed detection section for detecting the rotating speed;
   a load factor detection section for detecting the load factor;
   an air intake amount detection section for detecting the air intake amount;

a correction amount map specifying section for specifying the correction amount corresponding to the reference opening degree, the rotating speed, and the load factor, on the basis of a plurality of the basic correction amount maps and the extended correction amount maps obtained by the method of determining the correction amount of the opening degree of the EGR valve according to claim 2; and a correction amount specifying section specifying the correction amount corresponding to the reference opening degree, the rotating speed, and the load factor, on the basis of the correction amount map having been specified; and an opening degree control section for controlling the opening degree to the target opening degree corresponding to the correction amount and the reference opening degree having been specified.

\* \* \* \* \*